(12) United States Patent
Fitzwater et al.

(10) Patent No.: US 9,108,693 B2
(45) Date of Patent: Aug. 18, 2015

(54) USER PROPELLED RIDE-ON VEHICLE

(71) Applicant: Radio Flyer Inc., Chicago, IL (US)

(72) Inventors: Jason Fitzwater, Chicago, IL (US); Ian Grout, Strykersville, NY (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 14/169,684

(22) Filed: Jan. 31, 2014

(65) Prior Publication Data

US 2014/0217694 A1 Aug. 7, 2014

Related U.S. Application Data

(60) Provisional application No. 61/759,940, filed on Feb. 1, 2013.

(51) Int. Cl.
*B62K 21/00* (2006.01)
*B62K 9/00* (2006.01)

(52) U.S. Cl.
CPC ....................................... *B62K 9/00* (2013.01)

(58) Field of Classification Search
CPC ........ B62K 3/002; B62K 15/00; B62K 21/00; B62K 2700/56
USPC ............... 280/87.01, 87.021, 87.041, 87.042, 280/87.043
See application file for complete search history.

(56) References Cited

U.S. PATENT DOCUMENTS

| | | |
|---|---|---|
| 210,435 A | 12/1878 | Root |
| 837,812 A | 5/1908 | Johnson |
| 1,652,284 A | 12/1927 | Madsen |
| 2,577,416 A | 3/1949 | Geisse |
| D208,483 S | 9/1967 | Walklet |
| 3,663,038 A | 5/1972 | Hendricks |
| D230,755 S | 3/1974 | Brightbill |
| 4,076,270 A | 2/1978 | Winchell |
| 4,087,106 A | 5/1978 | Winchell |
| 4,088,338 A | 5/1978 | Winchell et al. |
| 4,123,079 A | 10/1978 | Biskup |
| 4,165,093 A | 8/1979 | Biskup |
| 4,200,304 A | 4/1980 | Hwang |
| 4,281,844 A | 8/1981 | Jackman et al. |
| 4,540,192 A | 9/1985 | Shelton |
| 4,776,604 A | 10/1988 | Valdez et al. |
| 5,039,121 A | 8/1991 | Holter |
| 5,090,716 A | 2/1992 | Borden |
| 5,098,087 A | 3/1992 | Matile et al. |

(Continued)

FOREIGN PATENT DOCUMENTS

EP 2371428 10/2011

OTHER PUBLICATIONS

International Search Report for related International Application No. PCT/US2014/014145, mailed May 23, 2014.

(Continued)

*Primary Examiner* — Hau Phan
*Assistant Examiner* — Bryan Evans
(74) *Attorney, Agent, or Firm* — McDermott Will & Emery LLP (57) ABSTRACT

A user-propelled vehicle is adapted for use as a ride on vehicle. The user-propelled ride on vehicle has a frame, a rider support platform, a steering column, a front cross member, a rear cross member, and a plurality of a caster assemblies coupled to the front and rear cross members at a front forward tilting angle to the vertical axis.

19 Claims, 7 Drawing Sheets

(56) References Cited

U.S. PATENT DOCUMENTS

| | | | |
|---|---|---|---|
| D437,364 S | 2/2001 | Jang | |
| D444,184 S | 6/2001 | Kettler | |
| 6,250,656 B1 | 6/2001 | Ibarra | |
| D448,430 S | 9/2001 | Wang | |
| 6,302,421 B1 * | 10/2001 | Lee | 280/210 |
| 6,306,065 B1 | 10/2001 | Liang | |
| 6,467,781 B1 | 10/2002 | Feng | |
| 6,499,751 B1 | 12/2002 | Beleski, Jr. | |
| D469,819 S | 2/2003 | Nicolle et al. | |
| 6,561,534 B2 | 5/2003 | Gu | |
| 6,619,678 B2 * | 9/2003 | van Ardenne | 280/87.041 |
| D481,423 S | 10/2003 | Nien | |
| 6,719,310 B1 | 4/2004 | Lin | |
| 6,908,090 B2 | 6/2005 | Chuang | |
| 6,908,091 B2 | 6/2005 | Chuang | |
| 6,976,687 B2 | 12/2005 | Beleski, Jr. | |
| 7,007,962 B2 | 3/2006 | Lai | |
| D569,448 S | 5/2008 | Sramek et al. | |
| D582,992 S | 12/2008 | Alais | |
| 7,597,334 B2 | 10/2009 | Chen | |
| 7,681,895 B2 | 3/2010 | Chen | |
| 7,926,825 B2 | 4/2011 | Chen | |
| D654,542 S | 2/2012 | Chiu et al. | |
| 8,128,109 B2 | 3/2012 | Chen | |
| 8,256,784 B2 | 9/2012 | Hadzicki et al. | |
| 2001/0040352 A1 | 11/2001 | Wang et al. | |
| 2004/0032105 A1 | 2/2004 | Tsai | |
| 2007/0114753 A1 | 5/2007 | Fritschen | |
| 2008/0029985 A1 | 2/2008 | Chen | |
| 2010/0117316 A1 | 5/2010 | Weiner et al. | |
| 2011/0018215 A1 | 1/2011 | Kristiansen | |
| 2011/0227305 A1 | 9/2011 | Chen | |
| 2011/0241302 A1 | 10/2011 | Lovley, II et al. | |
| 2012/0080860 A1 | 4/2012 | Park | |

OTHER PUBLICATIONS http://plasmacar.com/#page-2, PlasmaCar, Ride on Toy, dated at least as early as Jun. 25, 2012.
http://masoncorporation.com/shop/flying-turtle-merch/, Flying Turtle Scooter, Ride on Toy, dated at least as early as Jun. 25, 2012.
<http://yvolution.com/products/31-Y-Fliker-A3-Red.html>, Y Volution Flicker, Ride on Toy, dated at least as early as Jun. 25, 2012.
<http://www.pulsescooters.com/categories/1-products/16-series-kick/>, Pulse Slither, Scooter, dated at least as early as Jun. 25, 2012.
<http://www.razor.com/products/ripstik/>, Razor Ripstik, Ride on Toy, dated at least as early as Jun. 25, 2012.
<http://www.razor.com/products/caster-driven/siege/>, Razor Siege, Scooter, dated at least as early as Jun. 25, 2012.
<http://www.razor.com/products/caster-driven/powerwing/>, Razor Powerwing, Ride on Toy, dated at least as early as Jun. 25, 2012.
Owner's Manual, "Razor RipRider 360° Caster Trike," Ride on Toy, dated at least as early as Jun. 25, 2012.

* cited by examiner

FIG. 4

USER PROPELLED RIDE-ON VEHICLE

CROSS-REFERENCE TO RELATED APPLICATIONS

This application claims priority to U.S. Provisional Patent Application No. 61/759,940, filed Feb. 1, 2013, which is hereby incorporated herein.

TECHNICAL FIELD

The present disclosure relates generally to vehicles that may be ridden for recreation and, more particularly, to a vehicle that is propelled by a rider's motion or movement.

BACKGROUND OF THE INVENTION

Scooters, ride-on toys and other similar vehicles are popular with children and other riders as they may provide exercise, amusement and even transportation. While such vehicles are often propelled by a rider using his or her foot to push off of the ground, such as in the case of a traditional scooter or a foot-to-floor ride-on, vehicles that use a rider's motion have been developed. Prior art vehicles that use a rider's motion have certain drawbacks. The present embodiments seek to overcome certain of these limitations and other drawbacks of the prior art, and to provide new features not heretofore available. A full discussion of the features and advantages of the present embodiments is deferred to the following detailed description, which proceeds with reference to the accompanying drawings.

SUMMARY

According to one embodiment, the disclosed subject technology relates to a user-propelled ride on vehicle. In one embodiment the user-propelled ride on vehicle has a frame, a rider support platform, a steering column, a front cross member, a rear cross member, and a plurality of caster assemblies coupled to the front and rear cross members at a front forward tilting angle to the vertical axis.

According to another embodiment, the frame has a leading end portion and a trailing end portion.

According to another embodiment, the rider support platform is coupled to the frame between the leading end portion and the trailing end portion. In one embodiment, the rider support platform is a seat. In another embodiment, the seat is connected to the rider support platform.

According to another embodiment, the steering column is rotatably coupled to the leading end portion of the frame.

According to another embodiment, the front cross member is coupled to the rotatable steering column, and a first portion of the front cross member is positioned adjacent a first side of the frame and a second portion of the front cross member is positioned adjacent a second side of the frame. According to another embodiment, the front cross member is a unitary member.

According to another embodiment, the rear cross member is removable. According to another embodiment, the rear cross member is fixedly coupled to the trailing end portion of the frame. A first portion of the rear cross member is positioned adjacent the first side of the frame and a second portion of the rear cross member is positioned adjacent the second side of the frame. According to another embodiment, the rear cross member is a unitary member. According to another embodiment, a collar removably couples the trailing end portion of the frame and the rear cross member.

According to another embodiment, a first front caster assembly having a first front pivot axle is coupled to the first portion of the front cross member at a front forward tilting angle to a vertical axis through the front cross member. The first front pivot axle defines a first front pivot axis. A first front wheel is coupled to the first front pivot axle and rotatable about the first front pivot axis. The first front wheel is also rotatable about a first front wheel axis.

According to another embodiment, a second front caster assembly having a second front pivot axle is coupled to the second portion of the front cross member at the front forward tilting angle to the vertical axis through the front cross member. The second front pivot axle defines a second front pivot axis. A second front wheel is coupled to the second front pivot axle and rotatable about the second front pivot axis. The second front wheel is also rotatable about a second front wheel axis.

According to another embodiment, a first rear caster assembly having a first rear pivot axle is coupled to the first portion of the rear cross member at a rear forward tilting angle to a vertical axis through the rear cross member. The first rear pivot axle defines a first rear pivot axis. A first rear wheel is coupled to the first rear pivot axle and rotatable about the first rear pivot axis. The first rear wheel is also rotatable about a first rear wheel axis.

According to another embodiment, a second rear caster assembly having a second rear pivot axle is coupled to the second portion of the rear cross member at the rear forward tilting angle to the vertical axis through the rear cross member. The second rear pivot axle defines a second rear pivot axis. A second rear wheel is coupled to the second rear pivot axle and rotatable about the second rear pivot axis. The second rear wheel is also rotatable about a second rear wheel axis.

According to another embodiment, the user-propelled ride on vehicle has a footrest positioned over the front cross member. The footrest has a first foot platform adjacent the first side of the frame and a second foot platform adjacent the second side of the frame.

According to another embodiment, the user-propelled ride on vehicle has a frame having a leading end portion and a trailing end portion; a rider support platform coupled to the frame between the leading end portion and the trailing end portion; a steering column rotatably coupled to the leading end portion of the frame; a front cross member coupled to the rotatable steering column, a first portion of the front cross member positioned adjacent a first side of the frame and a second portion of the front cross member positioned adjacent a second side of the frame; a removable rear cross member fixedly coupled to the trailing end portion of the frame, a first portion of the rear cross member positioned adjacent the first side of the frame and a second portion of the rear cross member positioned adjacent the second side of the frame; a first front caster assembly having a first front pivot axle coupled to the first portion of the front cross member at a front forward tilting angle to a vertical axis through the front cross member, the first front pivot axle defining a first front pivot axis, and a first front wheel coupled to the first front pivot axle and rotatable about the first front pivot axis, the first front wheel also rotatable about a first front wheel axis, and a second front caster assembly having a second front pivot axle coupled to the second portion of the front cross member at the front forward tilting angle to the vertical axis through the front cross member, the second front pivot axle defining a second front pivot axis, and a second front wheel coupled to the second front pivot axle and rotatable about the second front pivot axis, the second front wheel also rotatable about a second front wheel axis; and, a first rear caster assembly having a first rear pivot axle coupled to the first portion of the rear cross member at a rear forward tilting angle to a vertical axis through the rear cross member, the first rear pivot axle defining a first rear pivot axis, and a first rear wheel coupled to the first rear pivot axle and rotatable about the first rear pivot axis, the first rear wheel also rotatable about a first rear wheel axis, and a second rear caster assembly having a second rear pivot axle coupled to the second portion of the rear cross member at the rear forward tilting angle to the vertical axis through the rear cross member, the second rear pivot axle defining a second rear pivot axis, and a second rear wheel coupled to the second rear pivot axle and rotatable about the second rear pivot axis, the second rear wheel also rotatable about a second rear wheel axis.

According to another embodiment the user-propelled ride on vehicle has a frame having a leading end portion and a trailing end portion; a rider support platform coupled to the frame between the leading end portion and the trailing end portion; a steering column rotatably coupled to the leading end portion of the frame; a front cross member coupled to the rotatable steering column, a first portion of the front cross member positioned adjacent a first side of the frame and a second portion of the front cross member positioned adjacent a second side of the frame; a rear cross member fixedly coupled to the trailing end portion of the frame, a first portion of the rear cross member positioned adjacent the first side of the frame and a second portion of the rear cross member positioned adjacent the second side of the frame; a first front caster assembly coupled to the first portion of the front cross member at a front forward tilting angle to a vertical axis through the front cross member, the first front caster assembly having a first front wheel rotatable about a first front pivot axis defined by the front forward tilting angle, and a second front caster assembly coupled to the second portion of the front cross member at the front forward tilting angle to the vertical axis through the front cross member, the second front caster assembly having a second rear wheel rotatable about a second front pivot axis defined by the front forward tilting angle; and, a first rear caster assembly coupled to the first portion of the rear cross member at a rear forward tilting angle to a vertical axis through the rear cross member, the first rear caster assembly having a first rear wheel rotatable about a first rear pivot axis defined by the rear forward tilting angle, and a second rear caster assembly coupled to the second portion of the rear cross member at the rear forward tilting angle to the vertical axis through the rear cross member, the second rear caster assembly having a second rear wheel rotatable about a second rear pivot axis defined by the rear forward tilting angle.

According to another embodiment, the user-propelled ride on vehicle has a frame having a leading end portion and a trailing end portion; a seat coupled to the frame between the leading end portion and the trailing end portion; a steering column rotatably coupled to the leading end portion of the frame; a steering member attached to a top end of the steering column; a front cross member coupled to the rotatable steering column, a first portion of the front cross member positioned adjacent a first side of the frame and a second portion of the front cross member positioned adjacent a second side of the frame; a first front caster assembly coupled to the first portion of the front cross member at a front forward tilting angle to a vertical axis through the front cross member, the front forward tilting angle defining a first front pivot axis for the first front caster assembly, the first front caster assembly having a first front wheel rotatable about the first front pivot axis, and a second front caster assembly coupled to the second portion of the front cross member at the front forward tilting angle, the front forward tilting angle defining a second front pivot axis for the second front caster assembly, the second front caster assembly having a second front wheel rotatable about the second front pivot axis; and, a first rear wheel coupled to a first portion of the frame adjacent the trailing end portion of the frame, the first rear wheel rotatable about an axis of the first rear wheel, and a second rear wheel coupled to a second portion of the frame adjacent the trailing end portion of the frame, the second rear wheel rotatable about an axis of the second rear wheel.

According to another embodiment, the user-propelled ride on vehicle has a frame having a leading end portion and a trailing end portion; a rider support platform coupled to the frame between the leading end portion and the trailing end portion; a steering column rotatably coupled to the leading end portion of the frame; a steering member attached adjacent a top end of the steering column; a front drive system coupled to the rotatable steering column, the front drive system comprising a first caster assembly positioned on a first side of the frame and angled at a front forward tilting angle to a vertical axis to define a first front pivot axis, and a second caster assembly positioned on a second side of the frame and angled at the front forward tilting angle to define a second front pivot axis, the first caster assembly having a first wheel rotatable about the first front pivot axis and also about the first wheel axis, the second caster assembly having a second wheel rotatable about the second front pivot axis and also about the second wheel axis; and, a first rear wheel coupled to the frame adjacent the trailing end portion of the frame and positioned on the first side of the frame, and a second rear wheel coupled to the frame adjacent the trailing end portion of the frame and positioned on the second side of the frame.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

While the ride on vehicle discussed herein is susceptible of embodiments in many different forms, there is shown in the drawings, and will herein be described in detail, preferred embodiments with the understanding that the present description is to be considered as an exemplification of the principles of the ride on vehicle and is not intended to limit the broad aspects of the disclosure to the embodiments illustrated.

Referring now to the figures, and initially to FIGS. 1-4, there is shown one embodiment of the user-propelled ride on vehicle 10 of the present disclosure. The vehicle has a frame 12, preferably formed by a tube having a leading end portion 11 and a trailing end portion 13. The head tube 14 is coupled in a fixed fashion to the leading end portion 11 of the frame 12. The head tube 14 features a generally vertical passage 16, which in one embodiment is used to support the steering column 17.

Figure 2:
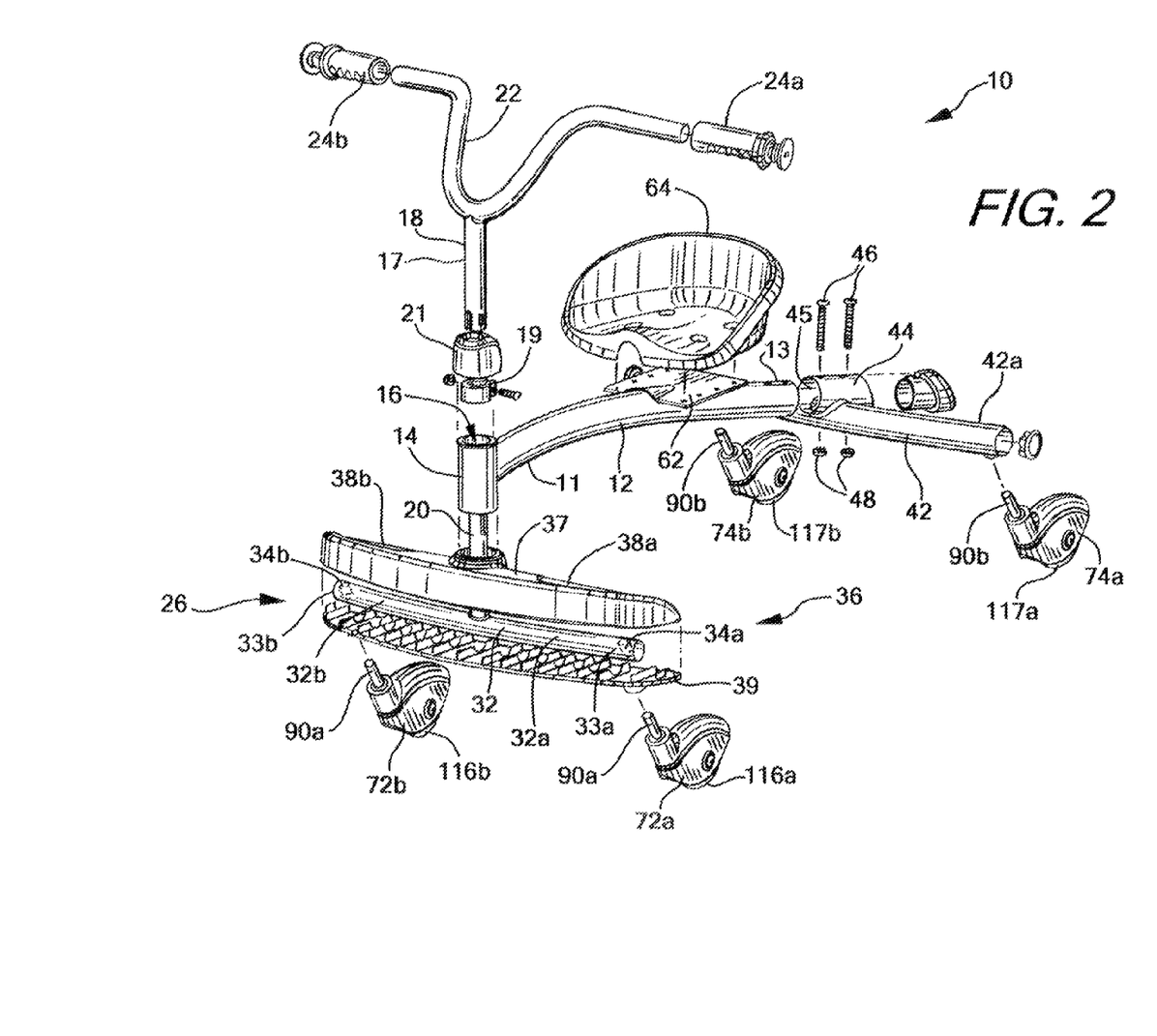
FIG. 2 is an exploded front perspective view of the user-propelled ride on vehicle of FIG. 1.

As best shown in FIG. 2, in one embodiment the steering column 17 comprises an upper portion 18 and a lower portion 20. The lower portion 20 of the steering column 17 passes through the passage 16 of the head tube 14 and connects to the upper portion 18 of the steering column 17 above the head tube 14. A clamp 19 secures the upper portion 18 and lower portion 20 of the steering column 17 together, and a protective cap 21 covers the installed clamp 19. The vertical passage 16 of the head tube 14 forms a bearing so that the steering column 17 rotates with respect to the frame 12 and head tube 14. Accordingly, the steering column 17 is rotatably coupled to the leading end portion 11 of the frame 12.

A steering member 22 is mounted to the top end portion of the upper portion 18 of the steering column 17 in a fixed fashion. In one embodiment the steering member 22 is a handlebar 22 and features a pair of handgrips 24a and 24b. An alternative type of steering member, such as a steering wheel or the like, may optionally be used in place of handlebar 22.

Figure 1:
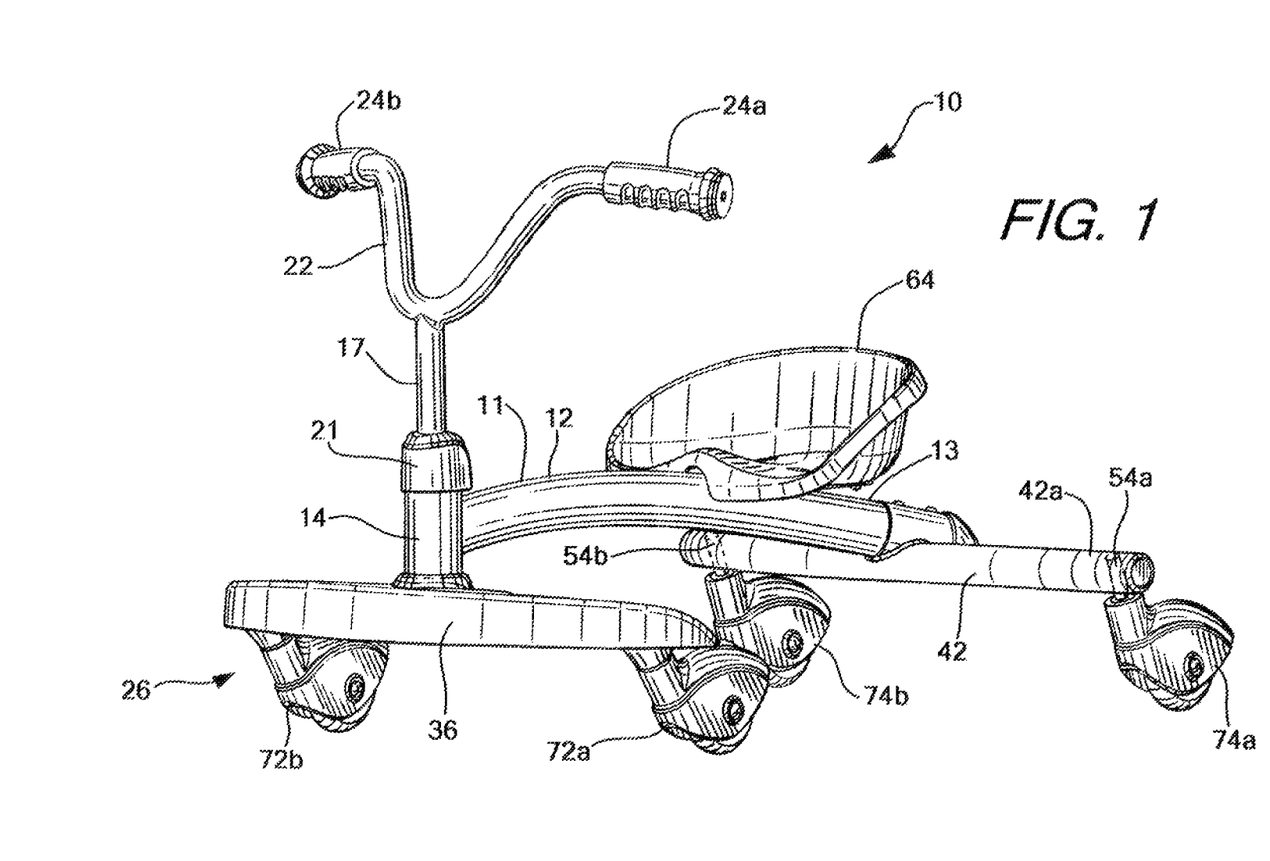
FIG. 1 is a front perspective view of an embodiment of the user-propelled ride on vehicle.

In one embodiment a front cross member 32 is coupled to the rotatable steering column 17, and preferably to the lower portion 20 of the steering column 17. A first portion 32a of the front cross member 32 is positioned adjacent a first side of the frame 12, and a second portion 32b of the front cross member 32 is positioned adjacent a second side of the frame 12. Preferably, the front cross member 32 is a unitary member. In a preferred embodiment, a footrest assembly 26 is provided as shown in FIGS. 1 and 2. The foot rest assembly 26 is generally coupled to the bottom end portion of the steering column 17 lower portion 20. In one embodiment, the foot rest assembly 26 includes a front cross member 32 that supports the front caster assemblies, and a foot rest or foot rest cover 36 positioned over the front cross member 32. Additionally, in a preferred embodiment, the front cross member 32 includes a first front caster support 33a at the first portion 32a of the front cross member 32, and a second front caster support 33b at the second portion 32b of the front cross member 32. In such an embodiment, the first and second front caster supports 33a, 33b may each have distal end portions within which generally downward-facing front caster sockets 34a and 34b, as shown in FIG. 2, may be formed. The front caster sockets 34a, 34b could alternatively be separate components that are attached to the front cross member 32. The front cross member 32 is attached to the bottom end of the steering column 17 so as to turn with the steering column 17 when the handlebar 22 is turned.

In a preferred embodiment, the foot rest cover 36 is positioned over the front cross member 32, so as to pivot or rotate with the front cross member 32. As illustrated in FIG. 2, in one embodiment the foot rest cover 36 has a top shell 37 and bottom panel 39 that are attached together so as to surround the front caster member 32. The top shell 37 and bottom panel 39 may be held together to the front caster member 32 by fasteners, such as screws or the like, adhesive or a snap-fit arrangement. The foot rest 36 preferably has a pair of foot platforms, indicated at 38a and 38b of FIG. 3. The foot platforms 38a, 38b may be recesses formed in the foot rest cover 36 or raised portions or flat surfaces formed on the foot rest cover 36. The first foot platform 38a is provided on the foot rest cover 36 adjacent the first side of the frame 12, and the second foot platform 38b is provided on the foot rest cover 36 adjacent the second side of the frame 12.

Foot rest assembly 26 may alternatively be constructed as a single piece where the front cross member 32 and the foot rest cover 36 are formed as a single piece, out of a material such as steel, aluminum, plastic or the like. Furthermore, foot platforms 38a and 38b may be independent pieces that are separately attached to the front cross member 32, or the foot platforms 38a, 38b may be integrally formed on the front cross member 32. In addition, the first and second portions 32a, 32b of the front cross member 32 may alternatively be formed as two separate pieces that are attached to the steering column 17 or as a single piece front cross member 32 (which may or may not be two pieces that are joined together to form the cross member).

Figure 8:
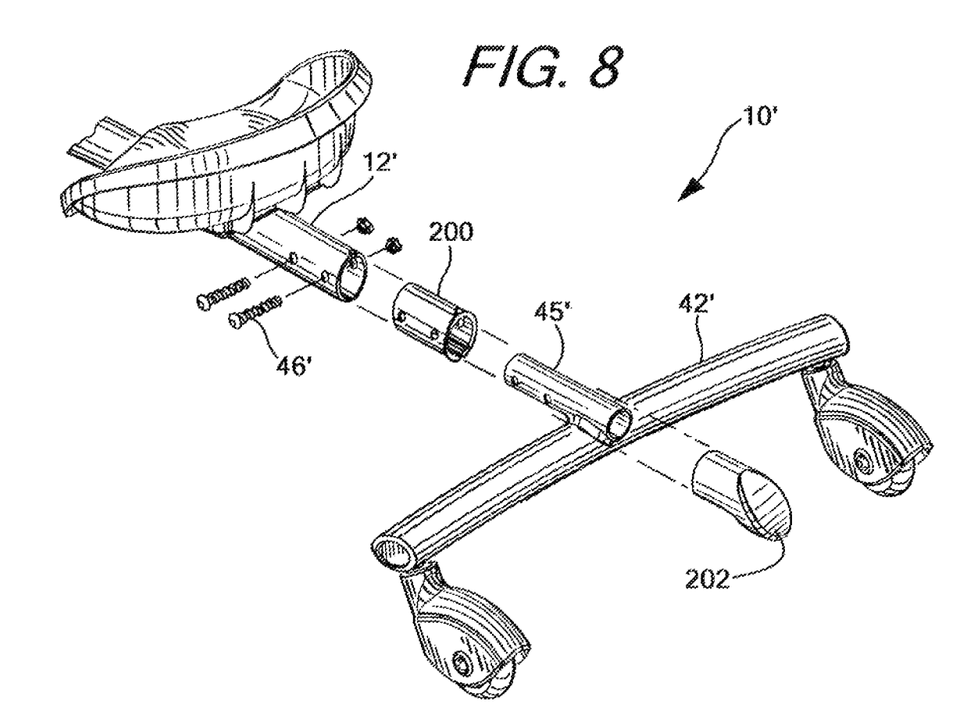
FIG. 8 is a partial rear perspective view of the user-propelled ride on vehicle of FIG. 7.

In one embodiment a rear cross member 42 is coupled to the trailing end portion 13 of the frame 12, and, in a preferred embodiment, preferably features a slight, rearward sweeping arc shape, however, a straight shape is operable as well. As illustrated in FIGS. 2 and 8, the rear cross member 42 is preferably coupled to the frame 12 in a fixed manner. However, in one embodiment the rear cross member 42 may be removably coupled to the frame 12, generally for shipping purposes, so that it can be placed in a smaller box for shipping and then fixed to the frame 12 during assembly. In one embodiment, the rear cross member 42 has a receiver 44 (see FIG. 2). Receiver 44 defines an interior 45 that is sized to receive the trailing end portion 13 of the frame 12 and ultimately fixedly connected thereto, preferably with fasteners, such as bolts 46 and 48. Bolts 46 pass through openings in the receiver 44 and corresponding openings formed in the trailing end portion 13 of the frame 12, and may be engaged by nuts 48.

Figure 3:
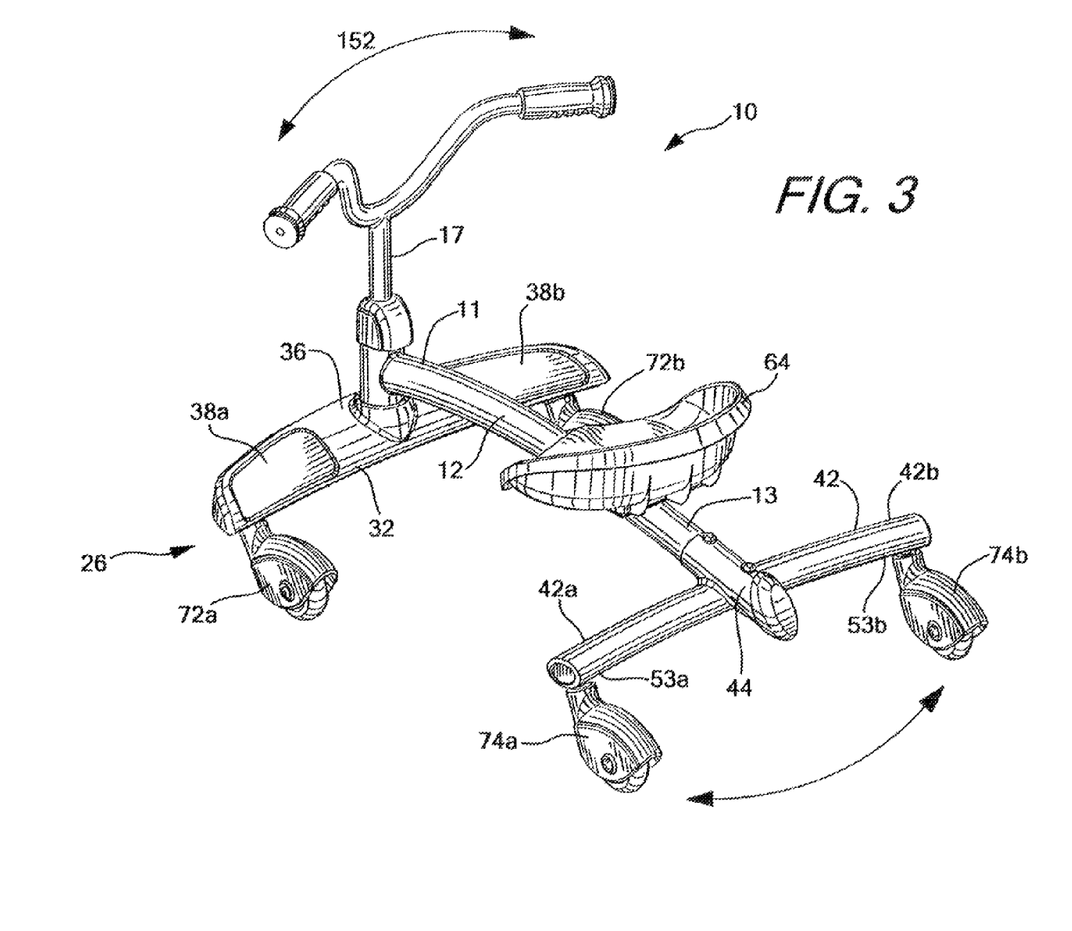
FIG. 3 is a rear perspective view of the user-propelled ride on vehicle of FIG. 1.
Figure 7:
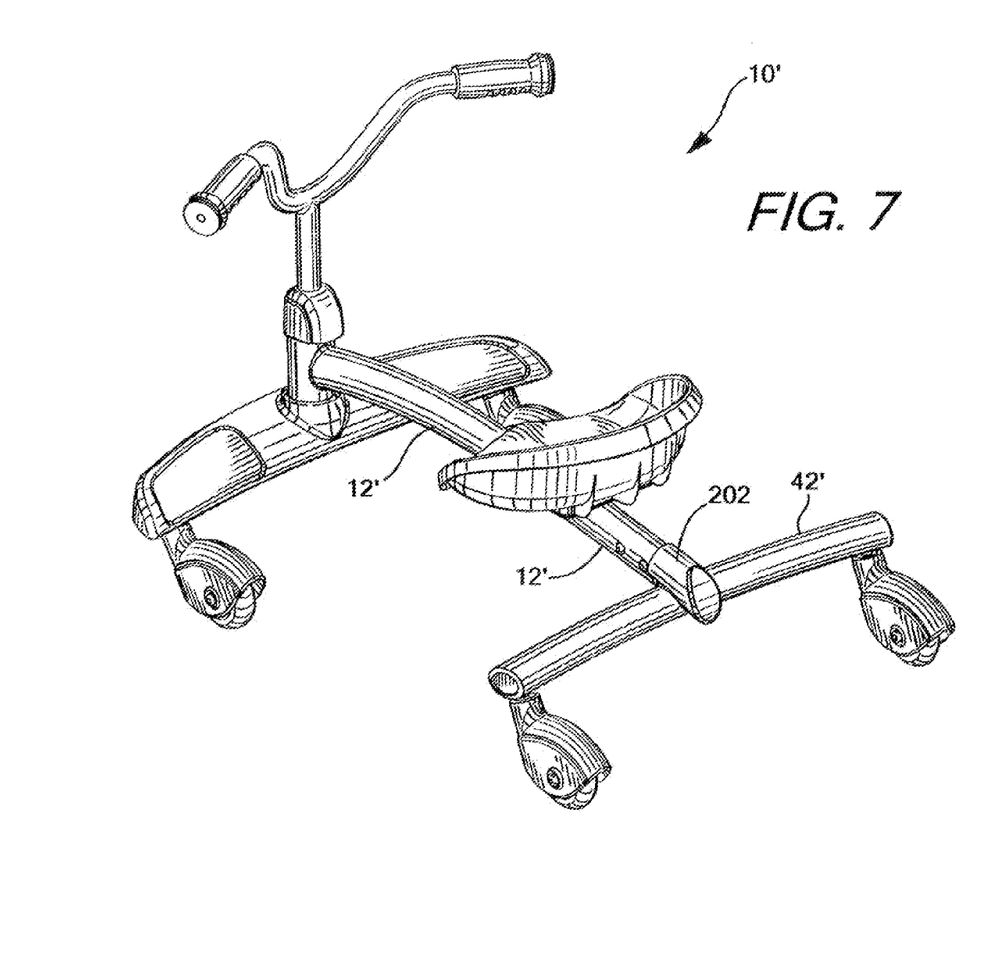
FIG. 7 is a rear perspective view of an alternate embodiment of the user-propelled ride on vehicle.

As best illustrated in FIGS. 3, 7 and 8, the rear cross member 42 has a first portion 42a positioned adjacent the first side of the frame 12, and a second portion 42b positioned adjacent the second side of the frame 12. In a preferred embodiment the first portion 42a forms a first rear caster supports 53a, and the second portion 42b forms a second rear caster support 53b. Additionally, in one embodiment the rear cross member 42 may have a pair of generally downward-facing rear caster sockets, as indicated at 54a and 54b in FIGS. 1 and 2, adjacent the distal ends of the first and second portions 42a, 42b, respectively. The first and second portions 42a, 42b of the rear cross member 42 may be formed as two separate pieces that are attached to the receiver 44, or as a single piece rear cross member 42 (which may or may not be two pieces that are joined together to form the cross member). The first and second rear caster supports 53a, 53b or rear cross member 42 may also alternatively be attached directly to the trailing end portion 13 of the frame 12.

With reference to FIG. 2, in one embodiment a rider support platform 62 is coupled to the frame 12 between the leading end portion 11 and the trailing end portion 13. In one embodiment the rider support platform 62 is a seat, and in an alternate embodiment a separate seat 64 is attached to the rider support platform 62, preferably with fasteners. As a result, in such an embodiment the seat 64 is secured to the rider support platform 62. The rider support platform that a rider may stand on may optionally be provided. In such an embodiment, the upper portion 18 of the steering column would need to be taller, and foot platforms 38a and 38b could be omitted.

In a preferred embodiment the frame 12, head tube 14, front cross member 32 and rear cross member 42 are all preferably constructed from aluminum or steel tubing, but other materials known in the art may be used instead, including plastics, polymers, fiberglass, wood, etc. Foot rest cover 36 and seat 64 may be constructed from plastic but, again, other materials known in the art may be used.

As illustrated in FIGS. 1-4, a first front caster assembly 72a and a second front caster assembly 72b are coupled to the front cross member 32. Preferably, the first front caster assembly 72a is coupled to the first portion 32a of the front cross member 32 and the second front caster assembly 72b is coupled to the second portion 32b of the front cross member 32. In one embodiment the pair of front caster assemblies 72a and 72b are attached to corresponding sockets 34a and 34b of the front cross member 32. In a preferred embodiment the caster assemblies are attached to distal ends of the cross members.

Similarly, in a preferred embodiment, a first rear caster assembly 74a and a second rear caster assembly 74b are coupled to the rear cross member 42. Preferably, the first rear caster assembly 74a is coupled to the first portion 42a of the rear cross member 42 and the second rear caster assembly 74b is coupled to the second portion 42b of the rear cross member 42. In one embodiment the pair of rear caster assemblies 74a and 74b are attached to corresponding rear sockets 54a and 54b of the rear cross member 42.

Figures 5, 6:
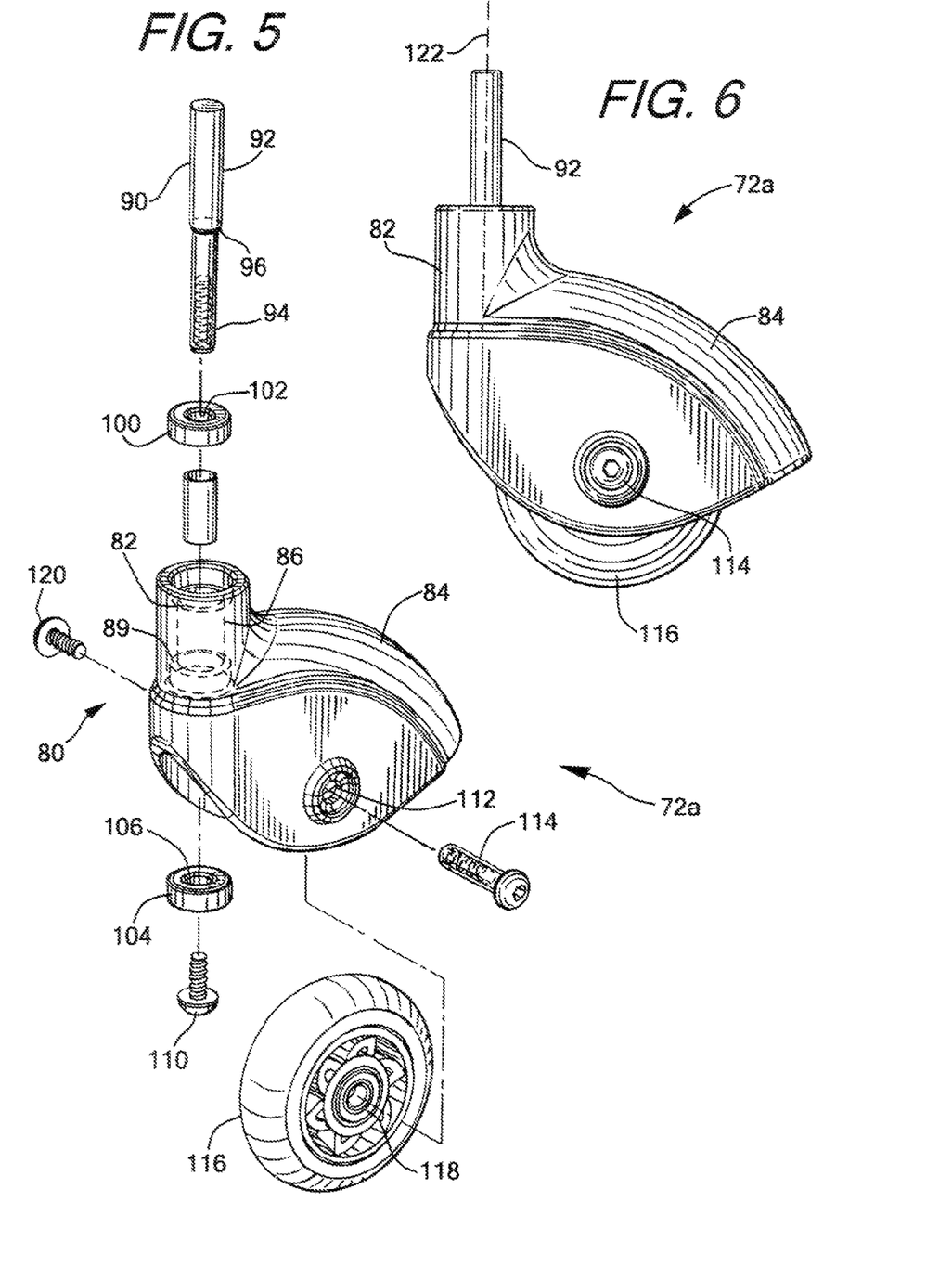
FIG. 5 is a perspective exploded view of one of the caster assemblies of the user-propelled ride on vehicle of FIG. 1.
FIG. 6 is an enlarged side elevational view of the caster assembly of FIG. 5 in the assembled condition.

Enlarged views of a preferred embodiment of the front caster assembly 72a are provided in FIGS. 5 (exploded view) and 6 (assembled view). In one embodiment the caster assembly may include a body 80 featuring a boss portion 82 and a fender portion 84. With reference to FIG. 5, boss portion 82 contains a generally vertical passage, indicated in phantom at 86, that features top and bottom portions having enlarged diameters, such as counterbores. The enlarged diameter top portion of the passage 86 is partially defined by upper annular shoulder 88, while the enlarged diameter bottom portion of the passage 86 is partially defined by lower annular shoulder 89.

In one embodiment, a pivot axle, indicated in general at 90, features an upper portion 92 and a lower portion 94 divided by a circumferential shoulder 96. As is apparent from FIG. 5, in this embodiment the upper portion 92 has a larger diameter than lower portion 94, where the lower portion features a downward-facing threaded bore and is sized to be received within the passage 86 of the boss portion 82 of the body 80.

With reference to FIG. 5, during assembly, an upper bearing 100 having central opening 102 is positioned within the enlarged top portion of the passage 86 of the body boss portion and rests on annular shoulder 88. The lower portion 94 of the pivot axle passes through the central opening 102 of the bearing and into the passage 86. A lower bearing 104 is positioned adjacent to lower annular shoulder 89 of the boss passage and features a central opening 106, through which the bottom end of lower portion 94 of the pivot axle passes. A screw 110 configured to engage the downward-facing threaded bore of the pivot axle lower portion 94 is then installed within the bore to secure the pivot axle 90, bearings 100 and 104, and body 80 together. Due to the bearings 100 and 104, the body 80, and accordingly the wheel 116 rotatably attached thereto, is free to pivot or rotate with respect to the pivot axle 90. Alternate means, such as bushings, etc. may be used to allow for rotation about the pivot axle 90.

The fender portion 84 of the body is provided with a wheel axle opening 112 through which wheel axle fastener 114 passes. A caster wheel 116 is provided with a central opening 118 through which the wheel axle fastener 114 also passes. The back side of the fender (not visible in FIG. 5 or 6) features a wheel axle opening similar and corresponding to wheel axle opening 112, and through which the wheel axle fastener 114 also passes. Wheel axle fastener 114 features a threaded bore which receives threaded screw 120. As a result, the wheel 116, preferably having a bearing through which the axle faster 114 is secured, is secured within the fender portion 84 of the caster body in a rotating fashion and is rotatable about its wheel axle, i.e., wheel axis. The fender portion 84 of the caster body aids in preventing a user from sticking his or her fingers in the caster assembly when the vehicle is in use and also guards against flying debris from the rotating caster wheels. Caster assemblies 72b, 74a and 74b feature a similar construction. While very detailed caster assemblies have been described, any caster assembly, and additionally any wheel assembly, which can be secured to the cross members 32, 42 may be provided as understood by those of skill in the art, and the claims are not limited in any way to the described caster assemblies.

Caster assembly 72a in an assembled condition is presented in FIG. 6. As illustrated in FIG. 1, the upper portion 92 of the pivot axle 90 protrudes above the caster body 82 for mounting the caster assemblies 72a, 72b, 74a and 74b to the front and rear cross members 32 and 42 of FIGS. 1-4. More specifically, with reference to FIG. 1, in a preferred embodiment the front caster assemblies 72a and 72b are assembled to the front cross member 32 by inserting their respective pivot axle upper portions (92 of FIG. 6) into sockets 34a and 34b, respectively. Similarly, in a preferred embodiment tear caster assemblies 74a and 74b are similarly assembled to the rear cross member 42 by inserting their respective pivot axle upper portions (92 of FIG. 6) into sockets 54a and 54b, respectively. As explained herein, alternate caster assemblies may be utilized. Generally, a caster assembly is merely a wheel assembly. For example, the pivot axle 90 may be provided apart from the caster assembly, such as a component of the front and/or rear cross members 43, 42. Even in this manner it may still be understood that the caster assembly has a pivot axle.

Figure 4:
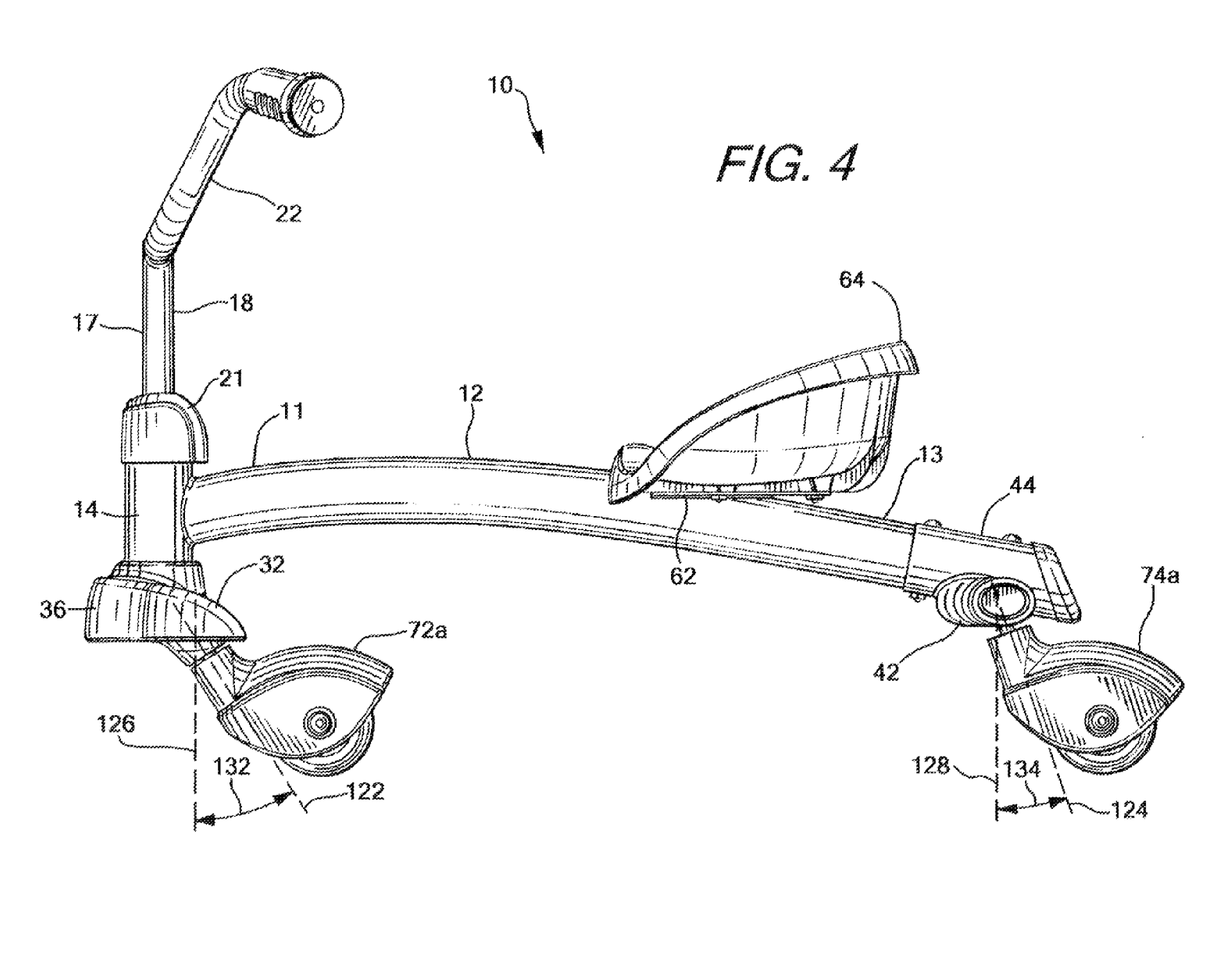
FIG. 4 is a side elevational view of the user-propelled ride on vehicle of FIG. 1.

With reference to FIGS. 2 and 4, in a preferred embodiment, each of the front caster assemblies 72a, 72b has a front pivot axle 90a, and each front pivot axle 90a has a front longitudinal or front pivot axis as indicated at 122 (also shown in FIG. 6 for front caster assembly 72a). Accordingly, the first front caster assembly 72a has a first front pivot axle 90a coupled to the first portion 32a of the front cross member 32, and the first front pivot axle 90a defines the first front pivot axis 122. Similarly, the second front caster assembly 72b has a second front pivot axle 90a coupled to the second portion 32b of the front cross member 32, and the second front pivot axle 90a defines the second front pivot axis 122. Because the first front wheel 116a of the first front caster assembly 72a is coupled to its first front pivot axle 90a, it is rotatable about the first front pivot axis 122. Similarly, because the second front wheel 116b of the second front caster assembly 72b is coupled to its second front pivot axle 90a, it is rotatable about the second front pivot axis 122 and identified as being rotatably coupled to the pivot axle.

Similarly, with reference to FIGS. 2 and 4, in a preferred embodiment, each of the rear caster assemblies 74a, 74b has a rear pivot axle 90b, and each rear pivot axle 90b has a rear longitudinal or rear pivot axis as indicated at 124. Accordingly, the first rear caster assembly 74a has a first rear pivot axle 90b coupled to the first portion 42a of the rear cross member 42, and the first rear pivot axle 90b defines the first rear pivot axis 124. Similarly, the second rear caster assembly 74b has a second rear pivot axle 90b coupled to the second portion 42b of the rear cross member 42, and the second rear pivot axle 90b defines the second rear pivot axis 124. Because the first rear wheel 117a of the first rear caster assembly 74a is coupled to its first rear pivot axle 90b, it is rotatable about the first rear pivot axis 124. Similarly, because the second rear wheel 117b of the second rear caster assembly 74b is coupled to its second rear pivot axle 90b, it is rotatable about the second rear pivot axis 124 and identified as being rotatably coupled to the pivot axle.

As illustrated in FIG. 4, the first portion 32a and second portion 32b, and preferably the first and second sockets 34a, 34b of the front cross member 32 are configured to couple the first and second front caster assemblies 72a, 72b to the front cross member 32 so that the front caster assemblies 72a, 72b each pivot about a front pivot axis (such as 122) that forms a forward-tilting angle with respect to a corresponding vertical axis, illustrated at 126 in FIG. 4, through the front cross member 32 for front caster assemblies 72. Similarly, in a preferred embodiment, the first portion 42a and second portion 42b, and preferably the first and second sockets 54a, 54b of the rear cross member 42 are configured to couple the first and second rear caster assemblies 74a, 74b to the rear cross member 42 so that the rear caster assemblies 74a, 74b each pivot about a rear pivot axis (such as 124) that forms a forward-tilting angle with respect to a corresponding vertical axis, illustrated at 128 in FIG. 4, through the rear cross member 42 for front caster assemblies 74. It is understood that a wheel or caster assembly coupled to the rear cross member may also be identified as being coupled to the frame adjacent the trailing end portion of the frame.

The forward tilting angles identified above are illustrated at 132 and 134 in FIG. 4. While a variety of angles may be used for 132 and 134, it has preferably been found that a front forward tilt angle 132 of approximately 32.5 degrees, and a rear forward tilt angle 134 of approximately 22.5 degrees are preferred. Even with these preferred forward tilting angles, it is understood that a manufacturing tolerance of +/− at least 2.5 degrees is acceptable. Further, while the above example of the forward tilting angles is preferred, it is understood that a deviation from the preferred tilting angles, including a deviation of +/−15 degrees for the rear tilting angle and +/−20 degrees for the front tilting angle will allow for appropriate operation of the user-propelled vehicle of the present disclosure.

Additionally, in an alternate embodiment not shown, the rear caster assembly may not be forward tilting, i.e., the tilting angle is zero degrees. In such an embodiment the first rear wheel 117a may be coupled to the first portion 42a of the rear cross member 42 without the first rear wheel 117a being positioned at a forward tilting angle, and the second rear wheel 117b may be coupled to the second portion 42b of the rear cross member 42 without the second rear wheel 117b being positioned at a forward tilting angle. Such is the case, for example, where the pivot axle, if provided for the caster assembly, extends generally vertical. Further, the rear wheel 117 may be provided apart from a caster assembly. For example, the first rear wheel 117a may be coupled to a first portion of the frame 12 adjacent the trailing end portion 13 of the frame 12, and the second rear wheel 117b may be coupled to a second portion of the frame 12 adjacent the trailing end portion 13 of the frame 12.

With reference to FIG. 3, in one embodiment a rider propels the vehicle by gripping hand grips 24a and 24b with his or her hands and moving or pumping the handlebar 22 back and forth, as indicated by arrow 152. Because the front caster assemblies 72a and 72b are mounted with their pivot axles at a forward-tilting angle, this motion causes the vehicle 10 to be propelled forward. Alternately, or in addition, the rider may rotate the front cross member 32 back and forth, as indicated by arrow 152, with their feet on the foot platforms to cause forward propulsion due to the forward-tilting angle of the front caster assemblies. Accordingly, the above describes a front drive system coupled to a rotatable steering column 17. Additionally, in embodiments with forward tilting rear wheels or forward tilting rear caster assemblies, when the rider moves or swings his or her hips side-to-side, the rear of the vehicle moves as indicated by arrow 154 so that the rear caster assemblies 74a and 74b aid in propelling the vehicle forward.

Handlebar 22 is also used to turn and steer the vehicle. Due to the vehicle featuring a caster wheel assembly at each corner in a preferred embodiment, it is easy for the rider to cause the vehicle to slide, drift and spin, which makes riding the vehicle even more entertaining.

An alternate embodiment of the vehicle 10a is shown in FIGS. 7 and 8. In the alternate embodiment 10', the removable rear cross member 42' is fixedly connected in a different manner to frame 12'. It is understood that in a further alternate embodiment the rear cross member may be fixed permanently to the frame. As best shown in FIG. 8, in this alternate embodiment with the removable rear cross member 42', to connect rear cross member 42' to the frame 12', post 45', which is preferably fixedly connected to cross member 42', is retained inside a collar or bushing 200 that fits either within frame 12' or around frame 12', and each of the frame 12', collar 200 and post 45' are secured together with connection members or fasteners. For example, in one embodiment connection members, such as bolts 46', secure the post 45' and bushing 200 within and to the frame 12'. In one embodiment the through holes in the frame 12' are oversized or somewhat slotted to allow for self-alignment of the rear cross member 42' when it is secured to the frame 12'.

Preferably, if collar or bushing 200 is provided inside of frame 12' it is made of an elastic material, such as plastic, however, a more rigid material such as aluminum or steel is also acceptable. Alternately, if it is provided outside of frame 12' it may be made of steel, aluminum or another generally rigid material. The shape of the outer surface of bushing 200 generally matches the shape of the inner surface of the end of the frame 12a, which in one embodiment is generally elliptical. The bushing 200 has a bore that is preferably generally circular in cross section to match the generally circular cross-sectional shape of post 45'. Accordingly, in one embodiment bushing 200 is fitted within the end of frame 12'. Next, in this alternate embodiment post 45' that extends from the rear cross member 42' is fitted within the bore of the bushing 200 and the three components are secured together with bolts 46'. This embodiment also includes an end cap 202 that is connected over the post 45' and cross member 42'.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the disclosure may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A user-propelled ride on vehicle, comprising:
    a frame having a leading end portion and a trailing end portion;
    a rider support platform coupled to the frame between the leading end portion and the trailing end portion;
    a steering column rotatably coupled to the leading end portion of the frame;
    a front cross member coupled to the rotatable steering column, a first portion of the front cross member positioned adjacent a first side of the frame and a second portion of the front cross member positioned adjacent a second side of the frame;
    a removable rear cross member fixedly coupled to the trailing end portion of the frame, a first portion of the rear cross member positioned adjacent the first side of the frame and a second portion of the rear cross member positioned adjacent the second side of the frame;
    a first front caster assembly having a first front pivot axle coupled to the first portion of the front cross member at a front forward tilting angle to a vertical axis through the front cross member, the first front pivot axle defining a first front pivot axis, and a first front wheel coupled to the first front pivot axle and rotatable about the first front pivot axis, the first front wheel also rotatable about a first front wheel axis, and a second front caster assembly having a second front pivot axle coupled to the second portion of the front cross member at the front forward tilting angle to the vertical axis through the front cross member, the second front pivot axle defining a second front pivot axis, and a second front wheel coupled to the second front pivot axle and rotatable about the second front pivot axis, the second front wheel also rotatable about a second front wheel axis; and,
    a first rear caster assembly having a first rear pivot axle coupled to the first portion of the rear cross member at a rear forward tilting angle to a vertical axis through the rear cross member, the first rear pivot axle defining a first rear pivot axis, and a first rear wheel coupled to the first rear pivot axle and rotatable about the first rear pivot axis, the first rear wheel also rotatable about a first rear wheel axis, and a second rear caster assembly having a second rear pivot axle coupled to the second portion of the rear cross member at the rear forward tilting angle to the vertical axis through the rear cross member, the second rear pivot axle defining a second rear pivot axis, and a second rear wheel coupled to the second rear pivot axle and rotatable about the second rear pivot axis, the second rear wheel also rotatable about a second rear wheel axis.

2. The user-propelled ride on vehicle of claim 1, wherein the rider support platform is a seat.

3. The user-propelled ride on vehicle of claim 1, further comprising a seat connected to the rider support platform.

4. The user-propelled ride on vehicle of claim 1, further comprising a footrest positioned over the front cross member, the footrest having a first foot platform adjacent the first side of the frame and a second foot platform adjacent the second side of the frame.

5. The user-propelled ride on vehicle of claim 1, wherein the front cross member is a unitary member.

6. The user-propelled ride on vehicle of claim 1, wherein the rear cross member is a unitary member.

7. The user-propelled ride on vehicle of claim 1, further comprising a collar removably coupled to the trailing end portion of the frame, and the rear cross member coupled to the collar.

8. A user-propelled ride on vehicle, comprising:
    a frame having a leading end portion and a trailing end portion;
    a rider support platform coupled to the frame between the leading end portion and the trailing end portion;
    a steering column rotatably coupled to the leading end portion of the frame;
    a front cross member coupled to the rotatable steering column, a first portion of the front cross member positioned adjacent a first side of the frame and a second portion of the front cross member positioned adjacent a second side of the frame;
    a rear cross member fixedly coupled to the trailing end portion of the frame, a first portion of the rear cross member positioned adjacent the first side of the frame and a second portion of the rear cross member positioned adjacent the second side of the frame;
    a first front caster assembly coupled to the first portion of the front cross member at a front forward tilting angle to a vertical axis through the front cross member, the first front caster assembly having a first front wheel rotatable about a first front pivot axis defined by the front forward tilting angle, and a second front caster assembly coupled to the second portion of the front cross member at the front forward tilting angle to the vertical axis through the front cross member, the second front caster assembly having a second rear wheel rotatable about a second front pivot axis defined by the front forward tilting angle; and,
    a first rear caster assembly coupled to the first portion of the rear cross member at a rear forward tilting angle to a vertical axis through the rear cross member, the first rear caster assembly having a first rear wheel rotatable about a first rear pivot axis defined by the rear forward tilting angle, and a second rear caster assembly coupled to the second portion of the rear cross member at the rear forward tilting angle to the vertical axis through the rear cross member, the second rear caster assembly having a second rear wheel rotatable about a second rear pivot axis defined by the rear forward tilting angle.

9. The user-propelled ride on vehicle of claim 8, wherein the first front caster assembly has a first front pivot axle coupled to the first portion of the front cross member and extending about the first front pivot axis, wherein the second front caster assembly has a second front pivot axle coupled to the second portion of the front cross member and extending about the second front pivot axis, wherein the first rear caster assembly has a first rear pivot axle coupled to the first portion of the rear cross member and extending about the first rear pivot axis, and wherein the second rear caster assembly has a second rear pivot axle coupled to the second portion of the rear cross member and extending about the second rear pivot axis.

10. The user-propelled ride on vehicle of claim 9, wherein the first front wheel of the first front caster assembly is rotatably coupled to the first front pivot axle, the first front wheel also rotatable about a first front wheel axis, and wherein the second front wheel of the second front caster assembly is rotatably coupled to the second front pivot axle, the second front wheel also rotatable about a second front wheel axis.

11. The user-propelled ride on vehicle of claim 9, wherein the first rear wheel of the first rear caster assembly is rotatably coupled to the first rear pivot axle, the first rear wheel also rotatable about a first rear wheel axis, and wherein the second rear wheel of the second rear caster assembly is rotatably coupled to the second rear pivot axle, the second rear wheel also rotatable about a second rear wheel axis.

12. A user-propelled ride on vehicle, comprising:
a frame having a central tubular member having a leading end portion and a trailing end portion;
a seat coupled to the central tubular member between the leading end portion and the trailing end portion;
a steering column rotatably coupled to the leading end portion of the frame;
a steering member attached to a top end of the steering column;
a front cross member coupled to the rotatable steering column, a first portion of the front cross member extending outwardly from a first side of the frame and a second portion of the front cross member extending outwardly from a second side of the frame;
a first front caster assembly coupled to the first portion of the front cross member at a front forward tilting angle to a vertical axis through the front cross member, the front forward tilting angle defining a first front pivot axis for the first front caster assembly, the first front caster assembly having a first front wheel rotatable about the first front pivot axis, and a second front caster assembly coupled to the second portion of the front cross member at the front forward tilting angle, the front forward tilting angle defining a second front pivot axis for the second front caster assembly, the second front caster assembly having a second front wheel rotatable about the second front pivot axis; and,
a first rear wheel coupled to a first portion of the frame adjacent the trailing end portion of the frame, the first rear wheel rotatable about an axis of the first rear wheel, and a second rear wheel coupled to a second portion of the frame adjacent the trailing end portion of the frame, the second rear wheel rotatable about an axis of the second rear wheel.

13. The user-propelled ride on vehicle of claim 12, further comprising a footrest connected to the front cross member, the footrest having a first fixed foot platform adjacent the first side of the frame and a second fixed foot platform adjacent the second side of the frame.

14. The user-propelled ride on vehicle of claim 12, wherein the first front wheel is also rotatable about a first front wheel axis, and wherein the second front wheel is also rotatable about a second front wheel axis.

15. The user-propelled ride on vehicle of claim 12, further comprising a first pivot axle connecting the first rear wheel to the frame, the first pivot axle having a generally vertical axis, wherein the first rear wheel is rotatable about the first pivot axle, and a second pivot axis connecting the second rear wheel to the frame, the second pivot axle having a generally vertical axis, wherein the second rear wheel is rotatable about the second pivot axle.

16. The user-propelled ride on vehicle of claim 12, further comprising a rear cross member fixedly coupled to the trailing end portion of the frame, a first portion of the rear cross member positioned adjacent the first side of the frame and a second portion of the rear cross member positioned adjacent the second side of the frame, wherein the first rear wheel is coupled to the first portion of the rear cross member, and wherein the second rear wheel is coupled to the second portion of the rear cross member.

17. A user-propelled ride on vehicle, comprising:
a frame having a leading end portion and a trailing end portion;
a rider support platform coupled to the frame between the leading end portion and the trailing end portion;
a steering column rotatably coupled to the leading end portion of the frame;
a steering member attached adjacent a top end of the steering column;
a front cross member connected to the steering column, the front cross member having a footrest, the footrest having a first fixed foot platform adjacent the first side of the frame and a second fixed foot platform adjacent the second side of the frame;
a front drive system connected to the front cross member, the front drive system comprising a first caster assembly positioned on a first side of the frame and angled at a front forward tilting angle to a vertical axis to define a first front pivot axis, and a second caster assembly positioned on a second side of the frame and angled at the front forward tilting angle to define a second front pivot axis, the first caster assembly having a first wheel rotatable about the first front pivot axis and also about the first wheel axis, the second caster assembly having a second wheel rotatable about the second front pivot axis and also about the second wheel axis; and,
a first rear wheel coupled to the frame adjacent the trailing end portion of the frame and positioned on the first side of the frame, and a second rear wheel coupled to the frame adjacent the trailing end portion of the frame and positioned on the second side of the frame.

18. The user-propelled ride on vehicle of claim 17, further comprising a rear cross member fixedly coupled to the trailing end portion of the frame, wherein the first and second rear wheels are connected to the rear cross member.

19. The user-propelled ride on vehicle of claim 18, wherein the first rear wheel and second rear wheels are positioned at a forward tilting angle to the vertical axis.

* * * * *